July 28, 1925.

N. J. DARDEN 1,547,251

NECKWEAR SECURING INSTRUMENTALITY

Filed June 11, 1923

Inventor

Newton J. Darden

By Frank A. Kane, Attorney

July 28, 1925.
N. J. DARDEN
1,547,251
NECKWEAR SECURING INSTRUMENTALITY
Filed June 11, 1923 · 2 Sheets—Sheet 2
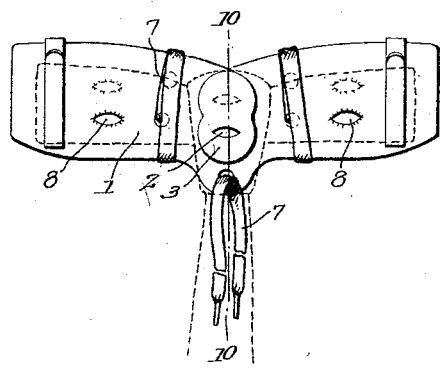
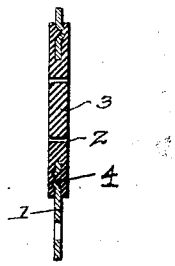
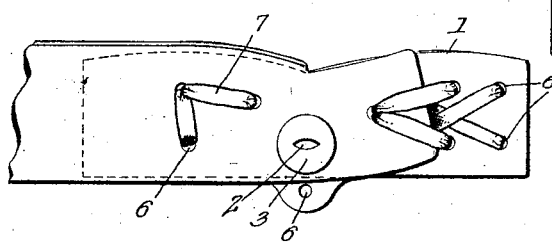
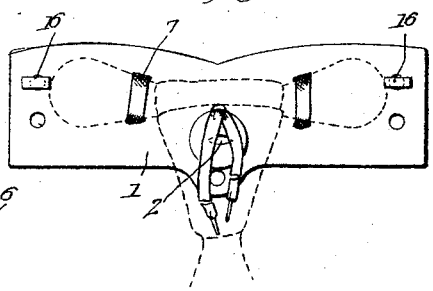
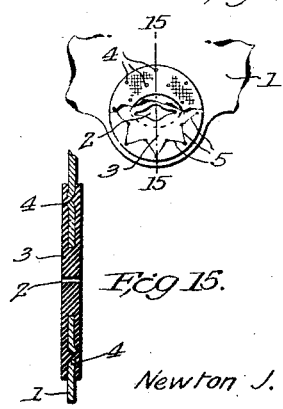
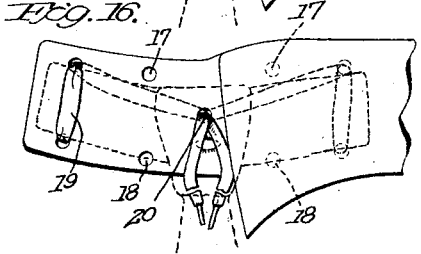
Inventor
Newton J. Darden
By Frank A. Kane, Attorney Patented July 28, 1925.

1,547,251

UNITED STATES PATENT OFFICE.

NEWTON J. DARDEN, OF WASHINGTON, DISTRICT OF COLUMBIA.

NECKWEAR-SECURING INSTRUMENTALITY.

Application filed June 11, 1923. Serial No. 644,657.

*To all whom it may concern:*

Be it known that I, NEWTON J. DARDEN, a citizen of the United States, residing at Washington, in the District of Columbia, have invented new and useful Improvements in a Neckwear-Securing Instrumentality, of which the following is a specification.

This invention comprises a neckwear securing instrumentality. One object intended to be accomplished by this device is to provide suitable means for attaching various types of neckwear to a collar, such as is usually worn by men; and, at the same time, to so construct the tie-carrying member that it may be readily attached to a collar and collar button, when placed in position, or be removed therefrom.

Another object of the invention is to provide a carrier support for neckwear which can be made of flexible, nonabsorbent moisture-proof material shaped to fit the collar structure and lie snugly within its folds; and that may be secured to a portion of the collar, to the collar button used to attach the collar, or to both the collar and collar button in such manner that the tie carrying instrumentality, in addition to its function as a carrier, serves as a support to maintain the collar in an upstanding position and prevent it from sagging, an objectionable feature particularly noticeable with soft collars now extensively worn.

A further object of the invention is to provide means for securing neckwear to a collar so as to eliminate discomfort due to binding or chafing of the neck of the wearer, and to produce a neat, simple tie-carrier that can be easily and cheaply made of stiffened sheet rubber, celluloid, linen, or other like materials utilized in the manufacture of men's collars.

Still further objects are to provide a button engaging and embracing tab which has a button-hole arrangement devised especially to grip the collar button shank, when placed thereon, with the firm contractile force of a soft rubber cushion disposed therein, the elasticity of the rubber permitting the tie-carrying member to be easily attached to or be removed from the head of the collar button. In connection therewith, interlocking spring clips are disposed within button-holes and held in operative position by resiliency of the body structure of the tie-carrying member, as an additional means of securing the tie-carrier to the lower inside collar band, thereby maintaining an intimate but adjustable reinforcing means by which the tie-carrying member is secured to the collar. Additional to these, round holes and lacing are provided both in the collar and the tie-carrying member by and through which means neckwear may be secured directly to a collar, to the tie-carrying member, or to both together when the collar is reinforced by an attached tie-carrying member.

Certain embodiments of the invention are illustrated in the accompanying drawings, the following views being shown:

Fig. 9 is a view in front elevation of another modified form of tie carrier shown in Fig. 1;

Fig. 10 is an enlarged detail view in vertical section on line 10—10 of Fig. 9;

Fig. 11 is a view in rear elevation showing a form of the invention wherein the tie carrier is secured to the collar by an extension of lacing means used to secure a tie to the carrier;

Fig. 12 is a view in front elevation of the form shown in Fig. 11;

Fig. 13 is a view in front elevation of still another modification of the device shown in Fig. 1;

Fig. 14 is a view in fragmentary detail of a portion of a button-hole, certain parts being broken away to show its construction;

Fig. 15 is an enlarged detail view, in vertical section, on line 15—15 of Fig. 14; and Fig. 16 is a fragmentary view in front elevation of a form of tie carrier wherein the securing instrumentality is embodied as a part of the collar structure itself.

Figure 1:
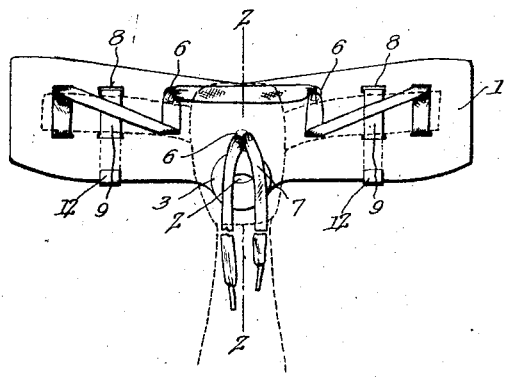
Figure 1 is a view in front elevation showing a form of tie-carrying and securing instrumentality adapted to be used in connection with a collar, a necktie being indicated in dotted lines.
Figure 2:
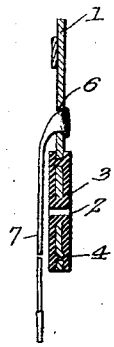
Fig. 2 is an enlarged detail view in vertical section on line 2—2 of Fig. 1.

In these views 1 designates a carrier, support or tie-carrying instrumentality. It comprises a body structure made from some nonabsorbent, water-proof material, preferably of celluloid or some of its derivatives, very pliable and shaped to conform to the collar structure and fit snugly beneath its folds, the upper edge of the carrier being aligned with the inner, upper edge of the collar fold, when placed in position. For the purpose of securing it in place, it is provided with a collar button engaging and retaining opening or button-hole 2 of special construction comprising a resilient button engaging member 3 formed preferably of new soft rubber; and extending through and around an enlarged opening in the celluloid carrier which is of much greater dimension than the button hole 2, as best seen in Figs. 2, 10, 14 and 15. Means are provided for assuring an intimate and positive connection between the elastic button engaging portion 3 and the carrier structure. As here shown, there are provided openings 4, best seen in the views just mentioned, through which the rubber meshes and is cemented to both sides of the carrier 1. The openings 4 are punched out and burred thus aiding in the more intimate attachment of these parts; and, in addition thereto, threads of stitching pass through said holes as indicated by numeral 5, in Fig. 14. The rubber is preferably faced by a wearing surface of fabric indicated by cross lines in Fig. 14; and the button hole is of relatively small size but adapted to permit ready insertion and removal of the head of the collar button by reason of the elasticity of the material of which it is composed. The resiliency of the rubber from which the button engaging member is made insures a secure gripping of the shank of the button after the head has passed through the opening. This button hole portion of the device is materially increased in thickness, the rubber button hole portion being also united through and around the large opening in the carrier proper and its edges extend beyond the margin of the opening and over a surface on both sides of the tie holder.

Means are associated with the tie holder or carrier for attaching neckwear thereto, and several embodiments of such means are shown in the drawings. Openings 6 are provided in the carrier proper, usually round in shape for the reception of a lacing element 7 by which neckwear is attached to the carrier. These openings are placed in predetermined arrangement on the body, certain of them being disposed on the extended portions or wings of the carrier at a spaced distance from the center so that there may be parts of the lacing directed around a folded portion of the necktie as shown in Figs. 1, and 9, for instance; and another hole is placed centrally adjacent to or in proximity to the carrier, securing button hole for the purpose of securing the ends of the lacing element and directing them forward to a position where they may be hidden from view by being tucked into the folds of the necktie.

Figure 4:
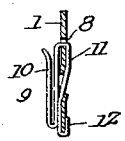
Fig. 4 is a view in vertical section on line 4—4 of Fig. 3.
Figures 7, 8:
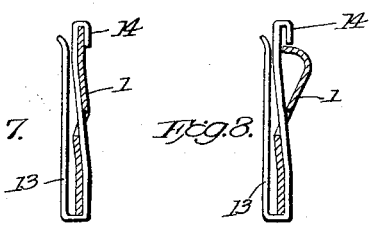
Figs. 7 and 8 are detail views partly in vertical section showing interlocking portions of a carrier and clip.

Additional to the round openings in the carrier, slotted openings 8, are provided through which and within which there are placed securing spring clips 9, two forms of which are shown in Figs. 4 and 7. Figure 4 shows a form of spring clip having a collar neckband engaging and retaining portion 10, on one side thereof, an extended portion 11 passing through two openings in the carrier and an upturned end portion 12 thereof, which engages the edge of the carrier itself, thus comprising an interlocking and securing means. These clips are utilized as additional means together with the button hole in the tab for securing the tie carrier to a collar-band or the inside portion of a collar with which it is detachably associated. The spring clips are readily insertable and removable from the tie-holder and carrier, the resiliency of the carrier structure materially aiding in this result.

Figs. 7 and 8 show another form of spring clip having a single prong 13 adapted to engage and retain either a portion of a necktie or a collar band; a body section portion extending through one of the slotted openings in the tie-carrier has a folded over end portion 14 to engage the edge of the carrier. The manner of inserting these clips is illustrated in Fig. 8, wherein the bending of the resilient carrier is utilized to permit an edge thereof being inserted or snapped into the bent-over portion 14 of the clip in such manner as to provide an interlocking means of securing the clip fixedly in place.

Figure 5:
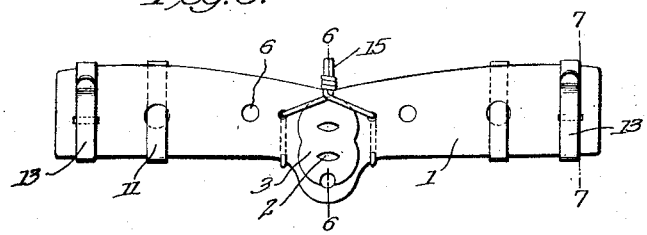
Fig. 5 is a view in front elevation of a slightly modified form of tie carrying instrumentality.
Figure 6:
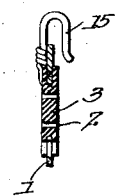
Fig. 6 is a view in vertical section on line 6—6 of Fig. 5.

In the form shown in Fig. 5, in addition to the instrumentalities described, there is other retaining means provided, here shown in the form of a small hook 15, having arms extending therefrom which pass through openings for the purpose in the carrier, the ends of the arms being bent back to constitute an embracing hook in engagement with the edge of the carrier. This form of securing means is used in connection with the attachment of bow ties to a narrow collar band when it may be desirable to have a neck-band engaging hook in addition to the button hole for securing the neck-wear holder in place.

Figure 3:
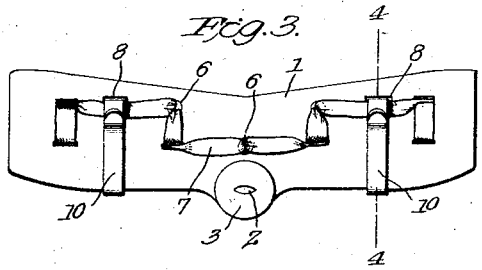
Fig. 3 is a view in rear elevation of the tie carrier member shown in Fig. 1.

In some instances it may be desirable to provide buttons on the collar or buttons inserted in button-holes within the collar band, one on each side of the the central collar button, to which the carrier is attached; and Fig. 9, shows a form wherein the slotted openings of Figs. 1, 3 and 5, for instance, are slightly modified so as to become adaptable for receiving buttons instead of the spring clips so placed. In this figure means are shown for providing adjustment of the carrier to meet different widths or heights of collars; and for this purpose a plurality of sets of button holes and other openings are provided, these being arranged in different planes with relation to the upper edge of the carrying member.

In Figures 11 and 12, the lacing element which secures the tie to the carrier, is utilized in addition as a means for securing the carrier to the collar. This is effected by providing co-operative openings or holes in the collar tab and band and by extending the lacing element through these openings and those of the tie-carrier which are co-operatively associated with each other.

Fig. 13, shows an arrangement adapted to be used with a ready made form of necktie now in general use, it having wings or the like parts for insertion under the outer folds of a turn down collar. In addition to the lacing which secures the tie to the carrier, ordinary metal paper fasteners 16 of a well known construction may be utilized for securing the tie-carrier to the inside collar band and tab.

In Fig. 16, there is shown a form wherein the tie carrying instrumentality is made integral with the collar structure or is embodied into the collar proper, this being effected by providing an extended and thickened collar tab with sets of holes or openings therein 17 and 18, spaced apart from each other in the same manner as the individual tie-carrying member Figs. 1, 3 and 5, and said holes extending from the button hole of the collar to an equal distance on each side thereof, so that corresponding holes appear in the end of the collar tab and in the collar band beneath the turned over fold of the collar proper. In this construction, the tab of the collar may be elongated somewhat more than usual to support the end of the tie which is secured thereto by a lacing element 19 passed through certain of the openings and round about the folded part of the necktie band Figs. 1, 3 and 9, the ends of the lacing being passed forward through a centrally disposed opening 20 beneath the necktie and is tucked into its folds to conceal them from view.

While the invention has been illustrated in the embodiments herein shown, it will be understood that many changes in details of arrangement of the parts may be made within the scope of the invention as set forth in the appended claims.

What I claim is:

1. A neckwear securing instrumentality comprising a carrier operatively associated with a collar structure, said carrier provided with openings therein for the reception of a lacing element; and a lacing element threaded through an opening in the carrier and adapted to secure neckwear to the carrier.

2. A neckwear securing instrumentality comprising a carrier embodying a collar tab, said carrier provided with openings therein for the reception of a lacing element; and a lacing element threaded into certain of the openings of the carrier and adapted to secure neckwear to said collar tab and collar structure.

3. A neckwear securing instrumentality comprising a carrier; means including a button-receiving opening and a resilient element operatively associated with the edges of the opening for securing the carrier in predetermined relation to a collar, whereby a portion of the collar will conceal a portion of the carrier; said carrier being provided with openings disposed at a point normally concealed by the collar; and a lacing element operatively associated with the openings for securing a necktie to the carrier.

4. A neckwear securing instrumentality comprising a carrier provided with openings for the reception of a lacing element; a resilient button embracing member disposed on the carrier, said carrier being also provided with slotted openings for the reception of additional securing means; and a spring clip operatively associated with certain of said slotted openings.

5. A neckwear securing instrumentality comprising a carrier provided with openings for the reception of a lacing element for securing neckwear to the carrier; and means, including an opening centrally disposed with relation to certain of the edges of the carrier for directing the ends of the lacing element behind a necktie when the tie is secured to the carrier.

6. A neckwear securing instrumentality comprising a carrier having a body provided with an enlarged opening therein; a resilient button embracing member disposed in said opening and having portions extending outwardly around edges of the opening and disposed on outer surfaces of the carrier; said button embracing member being provided with an opening of smaller dimension than the opening in the carrier.

7. A neckwear securing instrumentality comprising a carrier having a body provided with an enlarged opening therein; a resilient button embracing member disposed in said opening and having portions extending outwardly around edges of the opening and disposed on the outer surfaces of the carrier; said button embracing member being provided with an opening of smaller dimension than the opening in the carrier; and means including small burred openings provided in the carrier through which a portion of the resilient button embracing member is passed, for securing the button hole member to the carrier.

8. A neckwear securing instrumentality including a carrier operatively associated with a collar tab, said carrier being provided with a plurality of openings therein; a lacing element threaded through certain of the openings in the carrier and adapted to secure neckwear to the carrier; and means operatively associated with other openings in said carrier for attaching the carrier to a collar tab and collar structure.

9. A neckwear securing device comprising a carrier provided with openings therein operatively associated with a collar tab, said collar tab also provided with openings therein adapted to register cooperatively with openings in the carrier, and said carrier being further adapted to lock between the folds of a collar and a collar securing means when the carrier is attached to the collar tab; a lacing element threaded into certain of the openings to secure neckwear to the carrier; and means including the lacing element adapted to secure the carrier with neckwear attached thereto, to the collar tab and collar structure.

NEWTON J. DARDEN.